United States Patent [19]

Ikuma

[11] 4,364,448
[45] Dec. 21, 1982

[54] SPEED CONTROL FOR WHEELED VEHICLES

[75] Inventor: Katsumi Ikuma, Iwata, Japan

[73] Assignee: Yamaha Hatsudoki Kabushiki Kaisha, Iwata, Japan

[21] Appl. No.: 270,652

[22] Filed: Jun. 4, 1981

Related U.S. Application Data

[63] Continuation of Ser. No. 57,347, Jul. 13, 1979, abandoned.

[30] Foreign Application Priority Data

Jul. 20, 1978 [JP] Japan .................................. 53-89225
Oct. 23, 1978 [JP] Japan ................................ 53-130719

[51] Int. Cl.³ .............................................. B62M 7/00
[52] U.S. Cl. ...................................... 180/206; 123/350; 180/179; 361/242
[58] Field of Search ................ 180/170, 179, 205, 206; 123/350; 361/236, 242

[56] References Cited

U.S. PATENT DOCUMENTS

| | | | |
|---|---|---|---|
| 3,939,932 | 2/1976 | Rosen | 180/206 |
| 3,949,359 | 4/1976 | Sorkin | 180/179 X |
| 3,991,843 | 11/1976 | Davidson | 180/206 |
| 4,062,421 | 12/1977 | Weber | 180/205 |
| 4,122,907 | 10/1978 | Davidson et al. | 180/206 |
| 4,133,406 | 1/1979 | Allerdist | 180/179 |
| 4,168,758 | 9/1979 | Holt | 180/206 |
| 4,170,274 | 10/1979 | Collonia | 180/179 |

FOREIGN PATENT DOCUMENTS 52-9242 1/1977 Japan .
52-37251 9/1977 Japan .
27956 7/1975 United Kingdom .

*Primary Examiner*—Joseph F. Peters, Jr.
*Assistant Examiner*—Michael Mar
*Attorney, Agent, or Firm*—Donald D. Mon

[57] ABSTRACT

A speed control for a wheeled vehicle which is propelled by a motive device that has a speed proportional to the vehicle speed, and a power output control to control the speed of the motive device. A first signal generator generates a signal proportional to a desired vehicle speed. A second signal generator generates a signal proportional to the actual vehicle speed. A comparator compares the signals to detect any difference, and controls an actuator to adjust the power output control to tend to eliminate the difference. The actual speed will thereby tend to approach the desired speed. The first signal generator can, if desired, be operated by the occupant of the vehicle as part of his propulsive effort, for example by driving a bicycle chain drive. The speed control also can have provisions to continue operations at a pre-set rate even when the first signal generator may be inactive, and to make appropriate power control settings at start-up and at the beginning of acceleration conditions.

36 Claims, 20 Drawing Figures

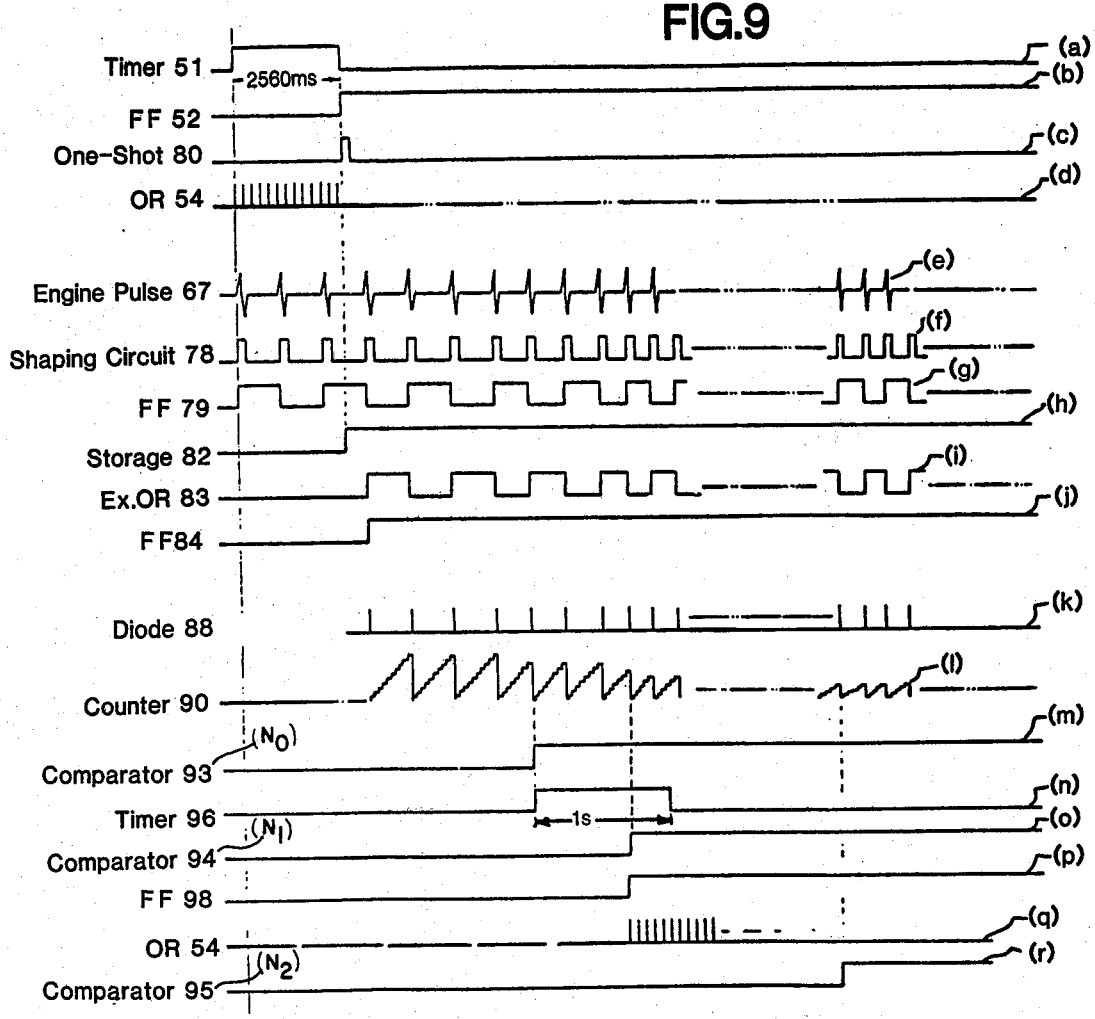
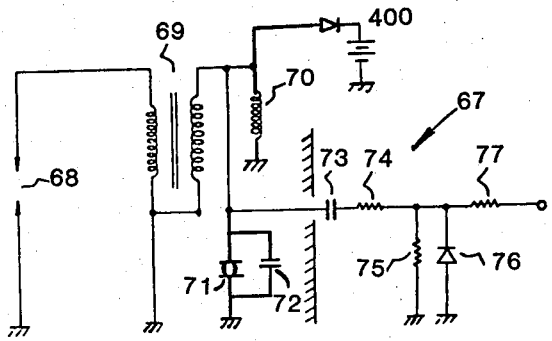

U.S. Patent   Dec. 21, 1982   Sheet 8 of 8   4,364,448 to AND gate 81 & EX or 83
FF 79
to AND gate 85
shaping circuit 78
315

Variable Resistor 304 to EX or 108
FF 104
to AND gate 110
Voltage-Frequency Converter 310
rotary type variable resistor 304

SPEED CONTROL FOR WHEELED VEHICLES

CROSS-REFERENCE TO CO-PENDING APPLICATION

This is a continuation of applicant's presently co-pending application Ser. No. 57,347, filed July 13, 1979, entitled "Speed Control for Wheeled Vehicle" now abandoned.

FIELD OF THE INVENTION

This invention relates to a speed control for wheeled vehicles, and to speed-controlled wheeled vehicles.

BACKGROUND OF THE INVENTION

Especially in the hybrid-type bicycle, which is provided both with driving pedals and with an internal combustion engine, it is a desirable objective to control its speed, especially when primarily driven by the engine. Also, it would constitute an advantage to relate the attained speed to some familiar and routine function of riding the bicycle, such as pedaling it, which can also assist in the propulsion of the vehicle, especially during accelerating conditions at lower speeds.

DISCLOSURE OF PRIOR ART

There is known in the prior art a bicycle of the hybrid type, which is equipped with both foot pedals and an internal combustion engine so that it can be driven either by working the foot pedals or by running the engine. In the earlier prior art, however, the foot pedals are used only when the engine malfunctions, or for starting the engine. In other words, the foot pedals are worked completely independently of the increase and/or decrease in the engine output power. Therefore, in these earlier devices, independent control means is required for controlling the increase and/or decrease in the engine's output power. The usual control means for this type is comprised of a throttle lever mounted on the handle of the bicycle, a carburetor attached to the engine, and a wire connected between them. As a result, the rider or driver of the bicycle has to accomplish the engine control in addition to steering and the application of the brake, thus complicating the driver's task.

Later improvements have been made in which the motive means was caused to apply driving force to the wheels as a consequence of turning the pedals. Examples are shown in Japanese Patent Publications No. 37251/1977, published Sept. 21, 1977 and No. 9242/1977, published Jan. 24, 1977. However, these have had many shortcomings.

OBJECTIVES OF THE INVENTION

It is an object of this invention to provide a vehicle speed control which can readily be set by an operator to cause the vehicle to approach and maintain a desired speed.

A preferred but optional feature of this invention is the provision of a first signal generator to generate a signal proportional to a desired vehicle speed which the rider himself generates, such as by turning a set of pedals.

Yet another preferred but optional feature of the invention is to provide the first signal generator in combination with some propulsive effort of the rider himself, such as part of a conventional sprocket-and-chain gear train. Thus the attained speed will be appropriate to the rider's own stimulus, but his required physical efforts will be reduced by the engine's power.

This invention is carried out with a wheeled vehicle which is propelled by motive means. The motive means has a speed proportional to the vehicle speed, and has a power output control, perhaps a throttle, which is adjustable to vary the power output of the motive means. A speed control for the vehicle includes actuator means for adjusting the power output control, a first signal generator for generating a first signal proportional to a desired vehicle speed, a second signal generator for generating a second signal proportional to the actual vehicle speed, and comparator means. The comparator means compares the signals and causes the actuator means to adjust the power output control to adjust the power output of the motive means to a level which tends to eliminate any difference between the desired and actual vehicle speeds.

According to a preferred but optional feature of the invention, the first signal generator generates its signal as the consequence of an effort of the occupant which is proportional to the desired speed.

According to still another preferred but optional feature of the invention, the first signal generator is driven by the occupant together with a personal propulsive effort to drive a wheel of the vehicle.

According to other preferred but optional features of the invention, means is provided for re-setting the power output control at starting, maintaining it at idling, and maintaining a desired velocity should the occupant no longer actuate the first signal generator, but not apply the brake.

The above and other features of this invention will be fully understood from the following detailed disclosure and the accompanying drawings, in which:

FIGS. 9 and 10 are time charts illustrating the operations of means of FIGS. 8(A) and 8(B);

FIG. 11 is a connection diagram showing a circuit for detecting engine pulses;

FIG. 14(A) is a fragmentary view of another embodiment of means for generating a first signal;

DESCRIPTION OF THE PREFERRED EMBODIMENT

Figure 1:
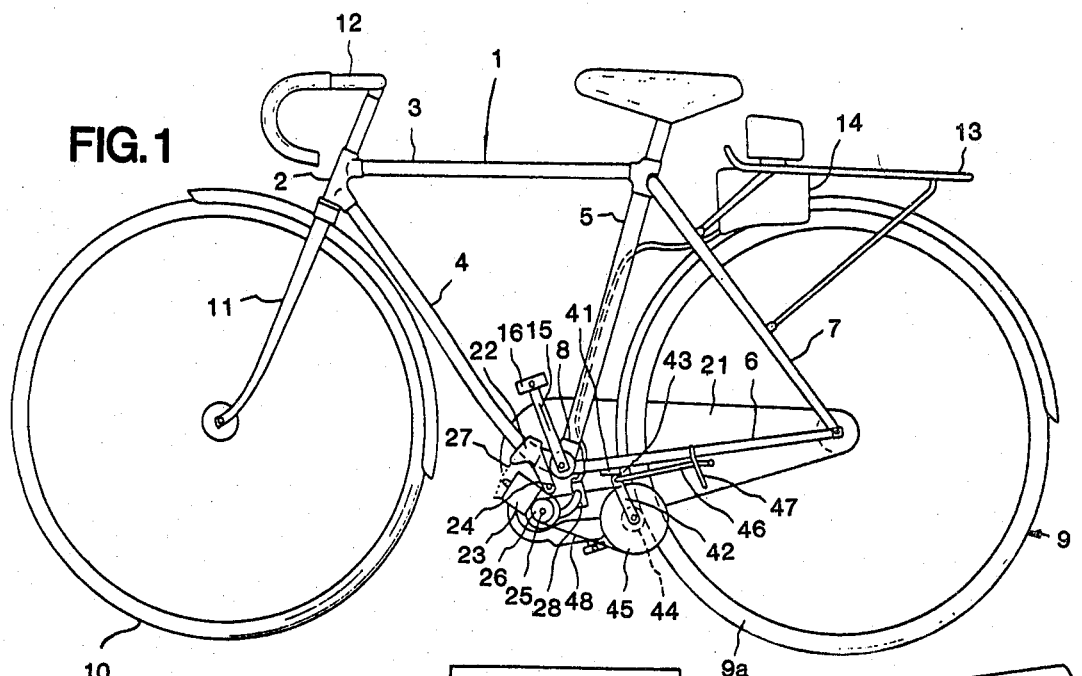
FIG. 1 is a side elevation showing a bicycle equipped with motive means and a speed control in accordance with the presently preferred embodiment of the invention.

With reference to FIGS. 1 to 4, the overall construction of the embodiment of the present invention will first be described. Indicated at reference numeral 1 is a bicycle frame of known type, which is comprised of a head tube 2, a top tube 3, a down tube 4, a seat tube 5, a chain stay 6, a seat stay 7, and a bracket lug 8 supporting a crank shaft (not shown). Reference numeral 9 indicates a rear wheel supported rotatably on the connecting pivot between the chain stay 6 and seat stay 7. Front wheel 10 is rotatably supported in a front fork 11. Front fork 11 is held rotatably in the head tube 2. A handle 12 is connected to the front fork 11 through the head tube 2. A luggage carrier 13 is supported by the seat stay 7 through carrier stays (not numbered). A fuel tank 14 is attached to luggage carrier 13. A pair of pedal cranks 15 are fixed to the crank shaft which is supported by the bracket lug 8. A foot pedal 16 is mounted rotatably to the free end of each pedal crank 15.

Figure 12:
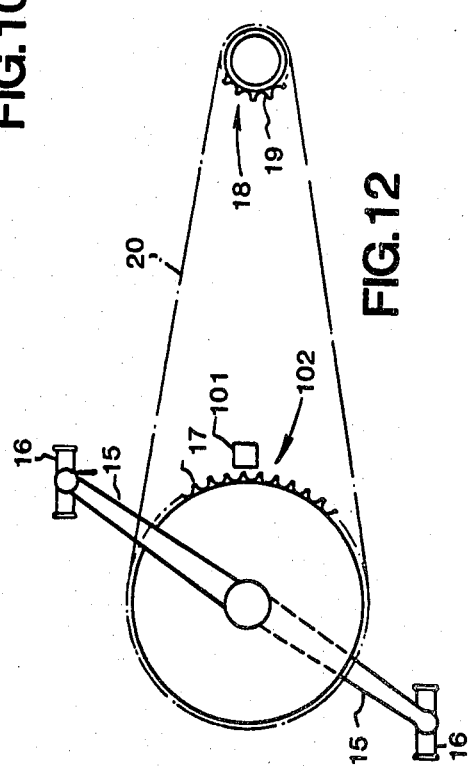
FIG. 12 is a side elevation showing the mounting of the first signal generator.

As better seen in FIG. 12, a chain sprocket 17 is fixed to the righthand pedal crank 15. A free wheel 18 is fixed to the rear wheel 9. A chain 20 is made to run between chain sprocket 17 and a toothed chain ring 19 mounted to the free wheel 18 in a conventional manner for driving the wheel forwardly. Reverting to FIG. 1, the chain sprocket 17, free wheel 18 and the chain 20 are covered by a case 21.

When the driver alternatively depresses the right and left foot pedals 16 of the bicycle to turn the chain sprocket 17 in the counter-clockwise direction, as viewed in FIGS. 1 and 12, the rear wheel 9 is also turned in the same direction through the chain 20 and the free wheel 18. Thus, there is constituted a drive mechanism (sometimes called a "drive train") for driving the bicycle by the occupant's working of the foot pedals.

The term "occupant" herein also means "rider", and the term "vehicle" is not limited to bicycles, but includes wheeled vehicles of all types.

The drive mechanism using the engine output power will be described later.

In FIG. 1, a bracket 22 is shown which has its body fixed to down tube 4 while extending downward to a lower portion of bracket lug 8. At the lower extension of bracket 22, there is pivotally held a prime mover (sometimes called "motive means") of the bicycle, in this example an internal combustion engine 23, at an inclination toward the front so that it can be rocked back and forth about a pivot 24. Engine 23 is equipped with a crank shaft 25, to which a drive pulley 26 of relatively small diameter is fixed. There is provided a coil spring 27, one end of which is retained at the upper end of the engine 23. Its other end is retained at bracket 22. Coil spring 27 is of the tension type so as to bias the engine 23 to rotate clockwise, as viewed in FIG. 1.

Figure 2:
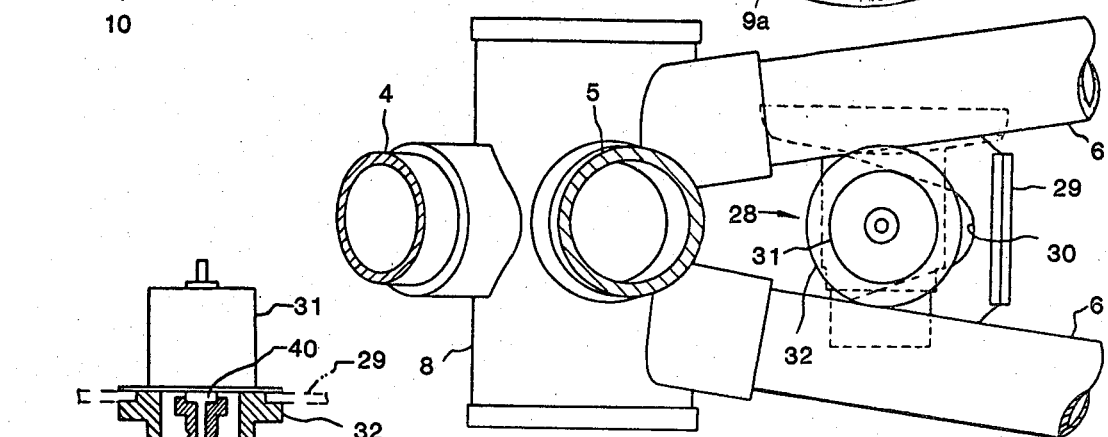
FIGS. 2 and 3 are top plan and side elevational views, respectively, showing the mounting condition of a carburetor which is to be used with the engine.
Figure 3:
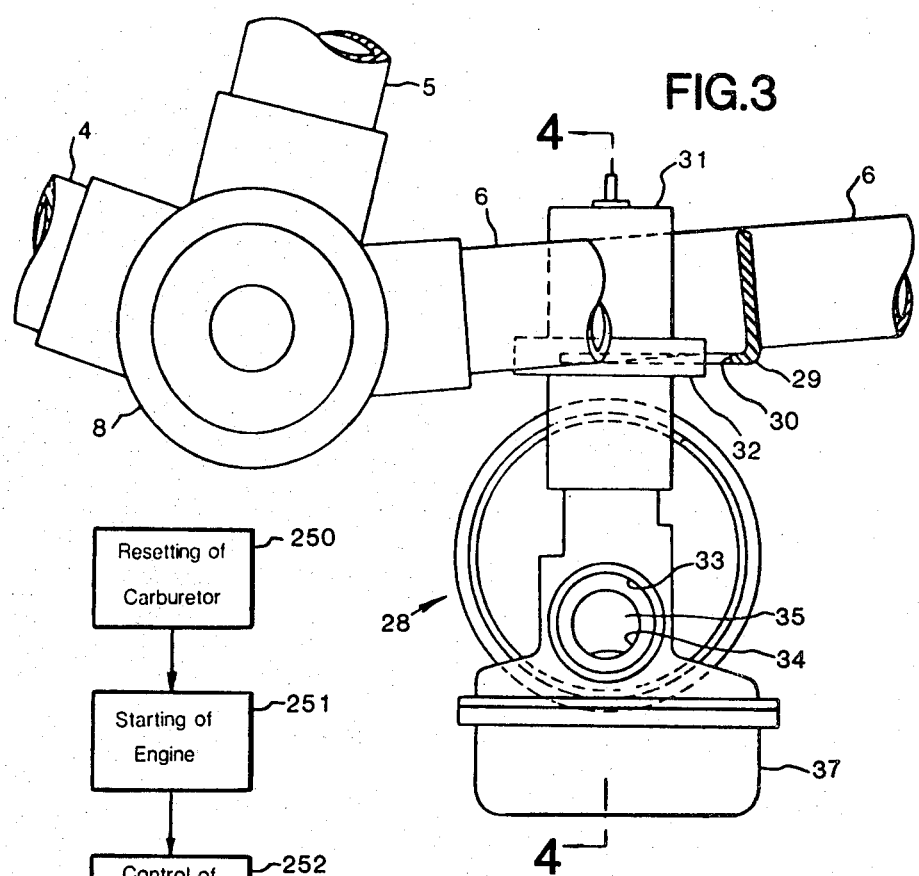

A carburetor 28 is located at the back of bracket lug 8. It is held between the paired legs of chain stay 6. The mounting of the carburetor 28 is best illustrated in FIGS. 2 and 3. As is apparent from these Figures, a bridge 29 is fixed between the right and left legs of chain stay 6. Bridge 29 is formed with a horseshoe notch 30, in which the carburetor 28 is held so that its portions clamp to bridge 29.

A stepping motor 31 (sometimes called "actuator means") is connected to the upper end of the carburetor 28. Bridge 29 is clamped between itself and a flange 32 which is formed at the connection.

Figure 4:
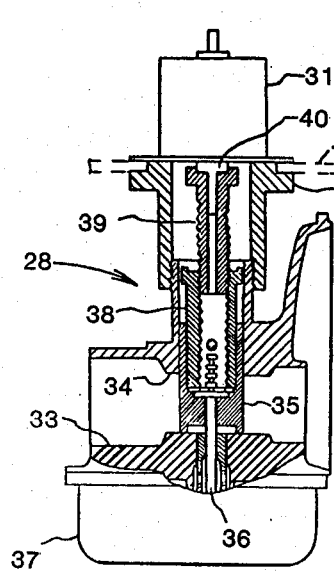
FIG. 4 is a longitudinal section of the carburetor taken along line 4—4 in FIG. 3.

Carburetor 28 is of the so-called "piston type", as seen in its longitudinal section of FIG. 4. Carburetor 28 is equipped with a throttle valve 35 (sometimes called "power output control") which is made vertically movable up and down into and out of the throat 34 of an intake passage 33 so as to vary the cross section at the throat. A jet needle 36 depends from throttle valve 35 so as to control the flow rate of fuel which is sucked from a float chamber 37 into the intake passage 33. There is fixed in throttle valve 35 a cylinder 38 which has its inner wall formed with a female thread and its top opened upward. It should be noted here that cylinder 38 does not rotate and is keyed to throttle valve 35. Accordingly, it and throttle valve 35 will move up and down together. There is threaded into the threaded inner wall of cylinder 38 a male screw 39 whose upper end receives a shaft 40 of stepping motor 31. Shaft 40 and screw 39 are joined by an adhesive so they turn together. As will readily be understood, the downstream side of intake passage 33 is connected to the intake port (not shown) of engine 23 by way of a flexible tube. Stepping motor 31 may be of the well-known two-phase excited type having four-phase stator windings, and is bi-directionally actuable.

When stepping motor 31 is energized to rotate, the cylinder 38 and accordingly with it throttle valve 35, are moved up and down in accordance with the rotating direction and number of rotations so that the opening or effective area of the throttle valve 35 is adjustably varied. The rotations of the stepping motor 31 are controlled to set the throttle in accordance with the desired running speed of the bicycle which is detected in response to the turning condition of the foot pedals 16, and the actual speed, so that the actual vehicle speed will approach the desired speed, as will be described later in more detail.

Reverting to FIG. 1, a bracket 41 is fixed to the lefthand leg of chain stay 6 so that it is located at the back of bridge 29. A support arm 42 which is extended backwardly at an inclination is supported on bracket 41 in a manner to be rocked back and forth about a pivot 43. Support arm 42 carries at its lower end a friction roller 44 and a follower pulley 45, which are coaxial. Friction roller 44 can be brought into and out of engagement with the outer circumference of the tire 9a of the rear wheel 9 by operating an actuating lever 46.

Follower pulley 45 is equipped with a conventional built-in centrifugal clutch (not shown). This centrifugal clutch device includes a first centrifugal clutch for transmitting the rotation of the rear wheel 9 to the engine at the time starting the engine and a second centrifugal clutch for transmitting the rotation of the engine to the rear wheel 9 after the engine starts. The first centrifugal clutch is adapted to slip when the rotation of the engine is transmitted to the rear wheel 9, thereby not transmitting the rotation in such a direction. Actuating lever 46 is fixed to support arm 42 so that it extends backward substantially in parallel with the chain stay 6. There is mounted on this chain stay 6 a retaining stepped plate 47 which is formed with a plurality of steps (not shown), where the rocking portion of the actuating lever 46 can be retained. All of those coactive members are so sized, shaped and positioned that friction roller 44 is brought into engagement with the outer circumference of tire 9a when actuating lever 46 is retained in the upper step of the retaining plate 47. Moreover, there is made to run on the drive pulley 26 and the follower pulley 45 a V-belt 48 which is brought into its tensioned and power transmitting condition when friction roller 44 engages tire 9a.

As a result, during the time while the actuating lever 46 is retained in the upper step of the retaining plate 47, as seen in FIG. 1, rotations of engine 23 are transmitted from drive pulley 26 to follower pulley 45 and further from friction roller 44 to tire 9a. After the engine 23 has reached a rotating speed higher than a preset value, the second centrifugal clutch in the follower pulley 45 will engage so that the driving force of engine 23 is transmitted to rear wheel 9 through friction roller 44.

Namely, when the engine operates above the "stall rotating speed", the second centrifugal clutch is in its completely engaged condition, so that the rotation is transmitted with the proportional relation between the vehicle speed and the rotation speed of the engine being 1 to 1. This "stall rotating speed" will be used herein to mean the critical rotating speed as to whether the relation between the vehicle speed and the rotation speed of the engine is in a proportional relation of 1 to 1. Namely, at this stall rotating speed, the slipping clutch becomes completely engaged and on the other hand the completely engaged clutch initials slipping. Therefore, if the rotation speed of the engine is above this stall rotating speed, the vehicle speed can be precisely detected from the rotation speed of the engine.

Figure 5:
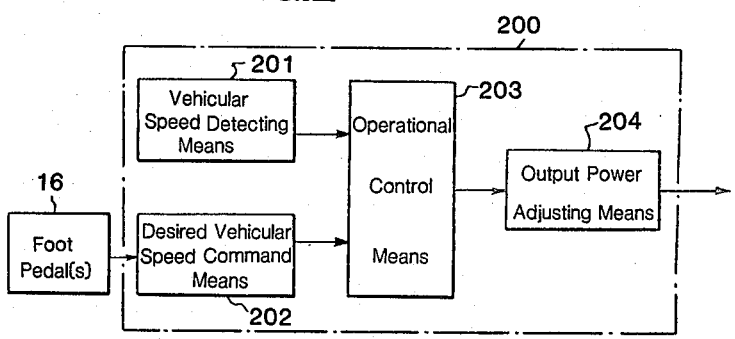
FIG. 5 is a block diagram of the speed control.

Turning now to FIG. 5, the present invention will be described in connection with the block diagram shown therein. Reference numeral 200 appearing in FIG. 5 indicates speed control means, which is made operative to control the engine output power in accordance with the turning conditions of the foot pedals 16, that is, as a function of a first signal generated by the first signal generator means driven by the pedals.

As shown, speed control means 200 comprises a second signal generator means 201 which detects the actual vehicle speed and generates a second signal proportional to the actual vehicle speed, a first signal generator means 202 for generating a first signal proportional to a desired vehicle speed (in this case, proportional to the rate at which the pedals are turned), comparator means 203 for operationally comparing the two signals and generating control signals in accordance with the operational results thereof, and actuator 204, means which in the physical embodiment includes stepping motor 31 that receives the control signals to adjust the power output control of the motive means so that the actual vehicular speed may approach the desired vehicular speed. Incidentially, although in the embodiment described herein the turning conditions of the foot pedals 16 are detected in terms of their turning speed, it should be understood that the present invention is not to be limited to such an embodiment, but can be extended to such modifications as those in which the depressing force to be applied to the foot pedals 16 is detected in terms of the tension of the chain and the tension is sensed to produce the desired first signal.

The speed control means 200 thus composed has as its objective to control the stepping motor 31, and will be described in more detail later. The speed control means 200 (except, of course, for stepper motor 31) can be constructed as a whole by a microcomputer (which will be shortly referred to as a "micom" or "CPU") with the programming according to the flow chart shown in FIG. 6. However, the details of this programming will be omitted here because a sequential statement of the overall programming is not only too complicated but also is not necessarily helpful to an understanding of this invention and also because it would be easy to a person skilled in the art to prepare necessary programs on the basis of the idea of this invention. Therefore, for simplicity, explanation will be made here only about logical circuits performing functions equivalent to that of a microcomputer. However, it should be noted that this invention includes a variety of embodiments. For example, the system of this invention may be constructed by using a microcomputer only or discrete hard logical elements only or by using discrete hard logical elements and microcomputer in combination.

Figure 6:
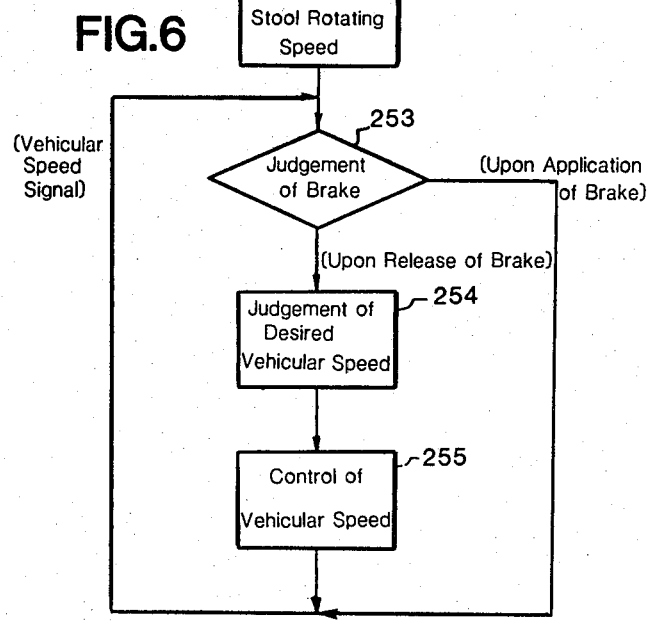
FIG. 6 is a flow chart showing the overall operations of the speed control system of the present invention.

The overall construction of the speed control system according to the present invention will be disclosed with initial reference to FIG. 6. In the embodiment shown, when a main switch is turned on, a carburetor resetting operation 250 is automatically carried out so that the carburetor 28 is fully opened. It is needless to say that the resetting operation can be accomplished instead fully to close carburetor 28. When the carburetor is reset the engine is ready to be started. Engine 23 is started as at 251 either by working the foot pedals 16 or by manually pushing the vehicle. This engine starting operation 251 may also be performed by operating the aforementioned actuating lever 46 so that the vehicle may be pedal propelled or shoved with friction roller 44 spaced from the tire 9a, and while the vehicle is moving setting actuating lever 46 so that the friction roller 44 is brought into engagement with the tire 9a. As an alternative, the engine starting operation may also be performed under the condition where the rear wheel of the vehicle is on a stand and out of contact with the ground. The rotating speed of engine 23 is detected in accordance with the ignition pulses of the engine 23 (which will be briefly referred to as the "engine pulses") so that the start of the engine 23 can be confirmed by detecting that its rotating speed has increased abruptly within a preset time (e.g., for one second).

Because carburetor 28 was reset to its full open condition, the initial output power of the engine 23 is likely to be increased abruptly. In the absence of a first signal, however, a stool rotating speed control 252 is effective to hold the engine rotating speed at the afore-mentioned stall rotating speed. At the next step, the brake applying condition is judged at 253. When the judgment results indicate the brake applied condition, control is performed so as to reduce the engine output power. If, on the contrary, the judgment indicates the brake released condition, the desired vehicular speed is judged at 254. As a result, the engine output power and the vehicular speed are controlled at 255 in accordance with the desired vehicular speed command signals which are generated in response to the judgment results 254.

Because follower pulley 45 includes the centrifugal clutch, the output power of the engine 23 is not transmitted to the rear wheel 9 when the rotating speed of the engine 23 is lower than the stool rotating speed. As the rotating speed of engine 23 is increased to and above the stool rotating speed, the centrifugal clutch is engaged to establish power transmission so that the rotating speed of the engine 23 becomes proportional to that of the rear wheel 9, i.e., to the vehicular speed. In those ways, the second signal generator means 201 (FIG. 5) is so constructed as to detect the vehicular speed in accordance with the engine rotating speed. The vehicular speed itself is stored, as will be seen later. The judgment of the desired vehicle speed in accordance with the turning condition of the foot pedals 16 is performed by the first signal generator means 202. The signals from means 202 are operationally compared with the aforementioned vehicular speed signals by comparator means 203. In accordance with the compared results, the setting of the throttle is performed by actuator means 31 (whose actuating power is derived from means 204).

The overall operations of the embodiment are performed in the manners described in the above. Speed control means 200 will be described in more detail below. First, description will be made of the resetting means for fully opening the carburetor 28 when the main switch is turned on.

Figure 7:
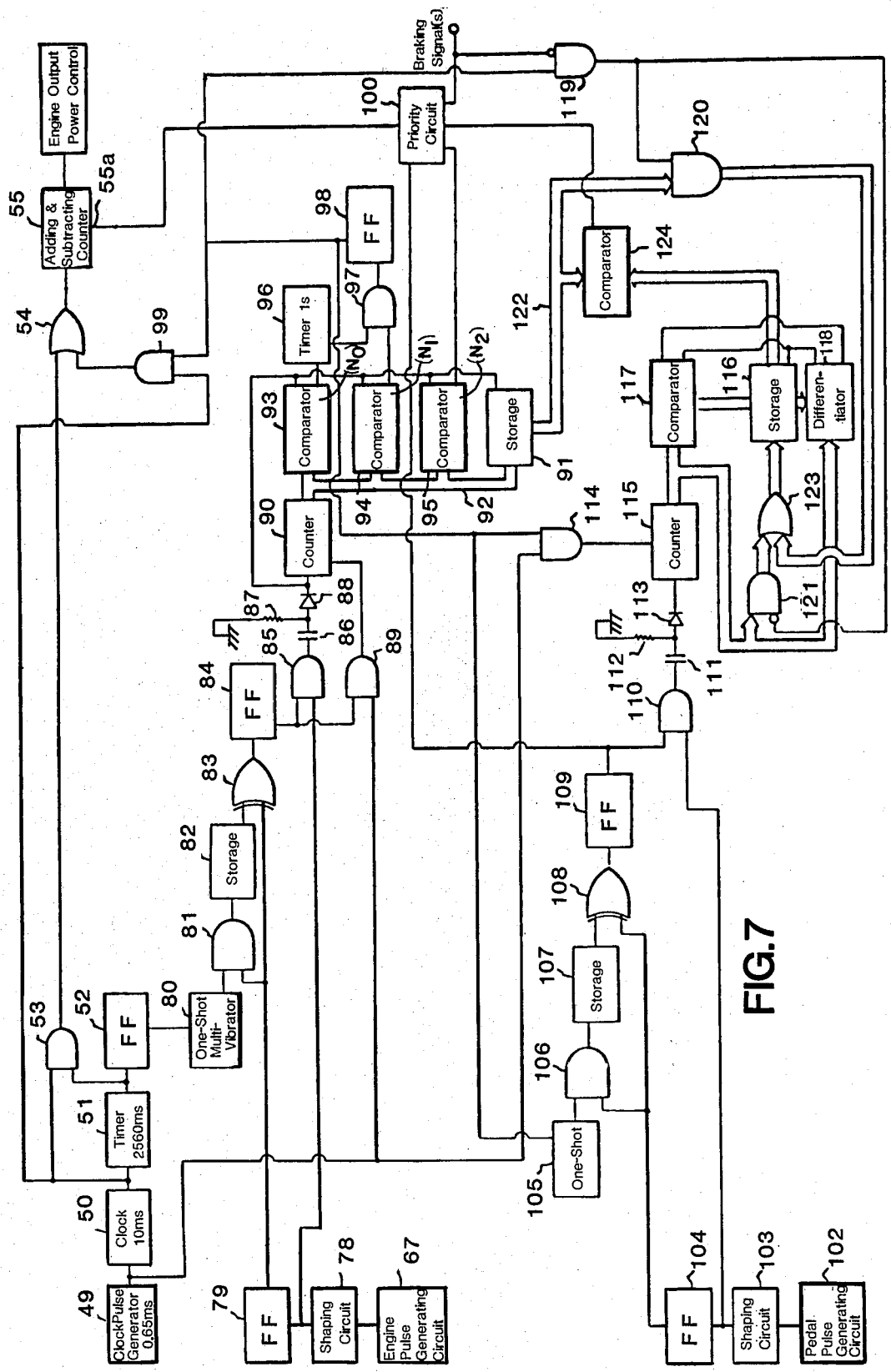
FIG. 7 is a block diagram showing further details of FIG. 5.

Indicated at reference numerals 49, 50 and 51 in FIG. 7 are a clock pulse generator (sometimes referred to as "clock") for continuously generating clock pulses having a duration of 0.65 milliseconds, a clock for dividing the frequencies of the clock pulses of the clock 49 to generate pulses having a duration of 10 milliseconds, and a timer for generating square waves having a duration of 2560 milliseconds in accordance with the pulses of the clock 50, respectively. Simultaneously as the power source circuit is made, the two clocks 49 and 50 begin generating their clock pulses, and the timer concurrently begins generating their ON signals, as better seen from FIG. 9 line (a). These ON signals are changed into OFF signals 2560 milliseconds later so that in response to this breaking operation the waveforms a flip-flop 52 (which will be shortly referred to as an "FF") generates ON signals, as seen from FIG. 9 line (b). The outputs of the clock 50 and the timer 51 are fed to an adding and subtracting counter 55 through an AND gate 53 and an OR gate 54. As a result, for the time period of 2560 milliseconds while the timer 51 is generating its ON signals, the clock pulses of the clock 50 having the duration of 10 milliseconds are fed to the adding and subtracting counter 55 (as seen from FIG. 9 line (d)). This counter 55 is made operative to normally add the clock pulses but to consecutively subtract the same when its subtraction command terminal 55a is supplied with the ON signals. Before the engine 23 is started, the subtraction command terminal 55a is supplied with the OFF signals so that the counter 55 accomplishes its adding operation. The counter 55 subjects the clock pulses to such operation with the use of the binary system that the lower two units of the clock pulses are supplied as the engine output control signals to the engine output power control means, which will be described later. This is because the stepping motor 31 being used has four-phase stator windings and adopts the two-phase exciting system thereby to make it sufficient to discriminate the lower two units of a binary number.

The means for controlling the aforementioned stepping motor 31 in accordance with the output of the adding and subtracting counter 55 will be described hereinafter with reference to FIG. 8(A). Reference numerals 56 and 57 indicate signal lines for transmitting the first and second units of the output control signals of the lower two units of the binary system of the adding and subtracting counter 55, respectively. The respective signal lines 56 and 57 are connected with logical circuits 58 to 61 which are made operative to generate ON signals "1" only upon the special signal combination and to generate OFF signals "0" during the condition other than that. More specifically, the respective logical circuits 58 to 61 are operative to generate the signals "1" only when their respective output power control signals are at "00", "01", "10" and "11" levels. Their operations will be described in more detail by taking up the logical circuit 58 as an example. This logical circuit 58 is equipped with exclusive OR gates (which will be briefly referred to as an "EX OR"), inverters 58b and an AND gate 58c.

Each of the two EX ORs 58a has one input terminal grounded to the earth (or at the "0" signal level). The other input terminals of the EX ORs 58a are connected with the signal lines 56 and 57, respectively. In this instance, the EX ORs 58a are made operative to generate the signals "1" when their two inputs are not coincident and the signals "0" when their two inputs are coincident. As has been mentioned above, said one input terminal of each EX OR 58a is always supplied with the signals "0". As a result, if the other input is supplied with the signals "0", the output of each EX OR 58a is respectively inverted by the corresponding inverters 58b into the "1" level. As a result, the AND gate 58c receives the signals "1" at its two input terminals so that it generates the signals "1". On the other hand, reference numerals 62 to 65 indicate logical circuits which are made operative to determine the direction of rotations of the stepping motor 31 in accordance with the respective outputs of the above logical circuits 58 to 61. More specifically, the stepping motor 31 is equipped with four stator coils 31a to 31d, all of which are turned on and off by means of NPN type transistors 66a to 66d (which will be briefly referred to as a "TR"), respectively. These TRs 66a to 66d are selectively and consecutively rendered conductive by the actions of the aforementioned logical circuits 62 to 65. Here, the logical circuit 62 is taken up as a representative and its operations will be described hereinafter. This logical circuit 62 is equipped with four AND gates 62a to 62d, each of which is made to have its one input terminal connected with the aforementioned AND gate 58c. The output terminals of the AND gates 62a to 62d are connected through respective not-numbered resistors with the bases of the TRS 66a to 66d, respectively. The other input terminals of the two AND gates 62a and 62c are preset at the potential of the power source (and accordingly at the signal level "1"), whereas the other input terminals of the remaining two AND gates 62b and 62d are grounded to the earth (and accordingly preset at the signal level "0"). As a result, when the aforementioned signal lines 56 and 57 are supplied with the signals "1", only the AND gates 62a and 62c of the logical circuit 62 generates the signals "1". As a result, the transistors TRs 66a and 65c are rendered conductive so that the stator coils 31a and 31c are energized.

Figures 8A, 8B:
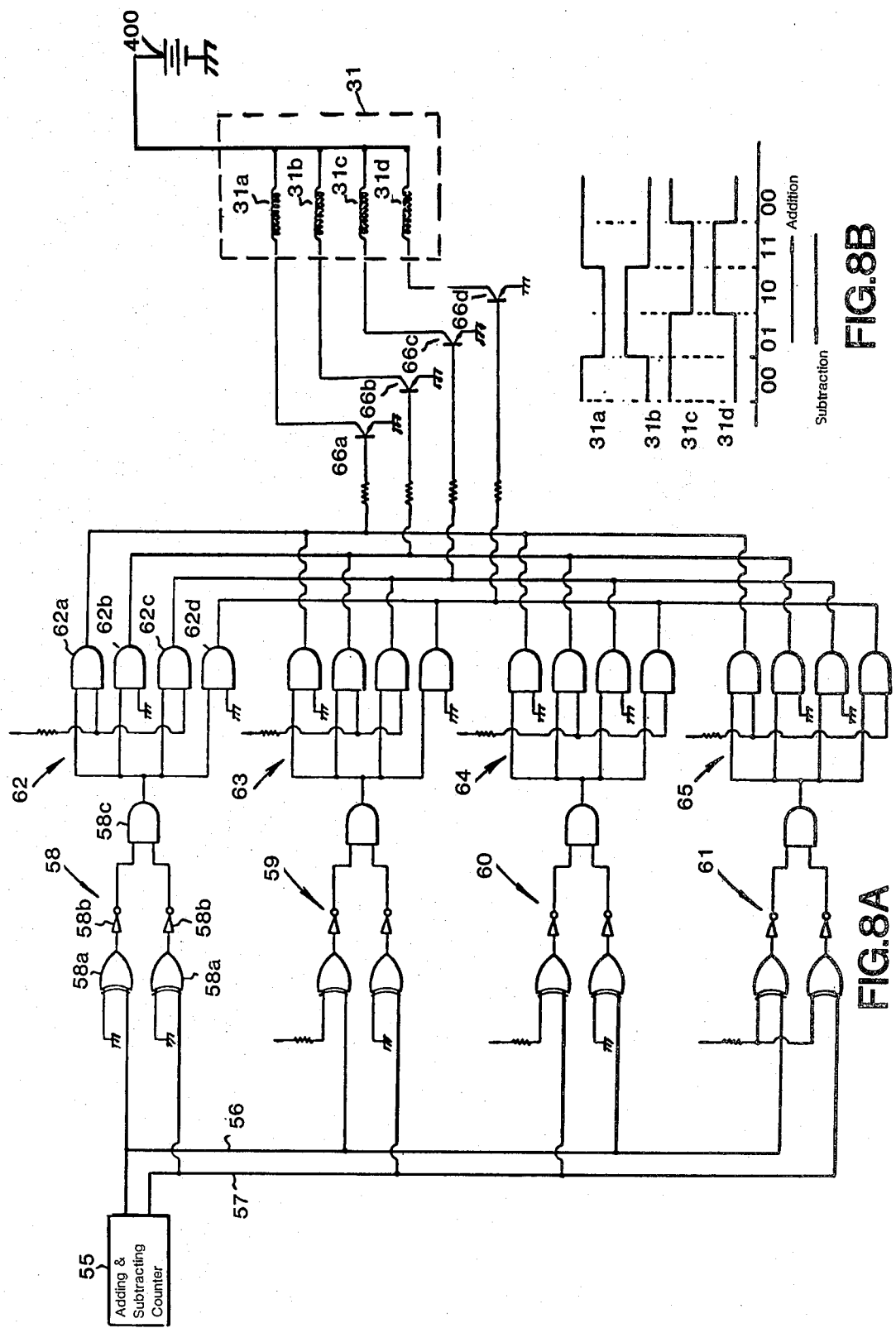
FIG. 8(A) is a block diagram showing the engine output power adjusting means.
FIG. 8(B) is an illustration of the mode of operations of the means of FIG. 8(A)

Now, the ON-OFF changes in the energizations of the stator coils 31a to 31d in accordance with the changes in the signals of the lines 56 and 57 can be tabulated in the following Table and are illustrated in FIG. 8(B).

TABLE I

| Signals | | Coils | | | | |
|---|---|---|---|---|---|---|
| | | 31a | 31b | 31c | 31d | 31a |
| Addition | 0 0 | ON | | ON | | ON |
| ↑   ↓ | 0 1 | | ON | ON | | |

TABLE I-continued

| Signals | | | Coils | | | |
|---|---|---|---|---|---|---|
| | | 31a | 31b | 31c | 31d | 31a |
| ↑ ↓ | 1 0 | | ON | | ON | |
| Subtraction | 1 1 | ON | | | ON | ON |

As is apparent from the Table, the energization conditions of the stator coils 31a to 31d are consecutively changed downward in the Table and rightwardly in FIG. 8(B) while the aforementioned adding and subtracting counter 55 is performing its addition, but upwardly in the table and leftwardly in FIG. 8(B) while the counter 55 is performing its subtraction. Since, in the embodiment under discussion, the stepping motor 31 uses the two-phase exciting system, a revolving magnetic field is generated in accordance with the energization conditions of the stator coils 31a to 31d. During the addition of the counter 55, moreover, the stepping motor 31, and the carburetor 28 are so preset that the throttle valve 35 of carburetor 28 is opened. During the subtraction of the counter 55, on the contrary, the stepping motor 31 is preset to close the throttle valve 35 of the carburetor 28.

Since the aforementioned resetting means operates the adding and subtracting counter 55 to add the clock pulses for the time duration of 2560 milliseconds which is preset by the timer 51, the output control means keeps the throttle valve 35 of the carburetor 28 opened for that time duration. Here, it should be noted that the stepping motor 31 has its capacity preset to retain its setting for that reset time duration. Before the resetting means is started, i.e., before the main switch is turned on, the throttle valve 35 is so constructed that it can be shifted to its fully open position at least during that reset time duration wherever the throttle valve 28 is positioned.

Reverting now to FIGS. 7 and 9, the second signal generator means 201 (sometimes called "vehicular speed detecting means") will be described. As has been mentioned, the vehicular speed can be detected in terms of the engine pulses. These engine pulses take the waveforms of FIG. 9, line (e). Other sources for the second signal could, of course, be used instead, provided they are proportional to the vehicle speed.

There is shown in FIG. 11 an engine pulse detecting circuit 67 which is made operative to detect the engine pulses. In FIG. 11, reference numeral 68 indicates an ignition plug, 69 an ignition coil, 70 a generating coil which is mounted in a flywheel magneto, 71 a breaker point which is turned on and off in synchronism with the engine rotations, and 72 a capacitor, all of which are well known in the art. The engine pulses are generated at the grounded side of the ignition coil 69 and have their DC components cut by means of a capacitor 73. Then, the engine pulses have their voltages divided and are subjected to half-wave rectification until they are supplied through a resistor 77.

The output of the detecting circuit 67 is then subjected to wave-form shaping process by means of a shaping circuit 78, which is composed of a Schmidt circuit 78, as shown in FIG. 7, so that it is converted into square waves corresponding to the ignition pulses of the engine 23, as shown in FIG. 9, line (f). These square waves then have their frequencies divided into halves by means of an FF (flip flop) 79 until they acquire the wave-forms as shown in FIG. 9, line (g).

On the other hand, the output of the FF 52 of the aforementioned resetting means is fed to a one-shot multivibrator 80 (which is briefly referred to as a "one-shot") so that it is converted into the output, as shown in FIG. 9 line (c). The outputs of the one-shot 80 and the aforementioned FF 79 are fed to an AND gate 81, the output of which is stored in a storage 82. That is to say, this storage 82 stores the output of the FF 79 when the one-shot 80 produces its output, as seen from FIG. 9, line (h). The outputs of the storage 82 and the aforementioned FF 79 are fed to an EX OR 83, the output (as shown in FIG. 9 line (i) which has its initial rise retained by an FF 84, as shown in FIG. 9, line (j). In other words, in response to the output of the one-shot 80, the FF 84 continues generating ON signals after the polarity has first changed. The outputs of this FF 84 and the shaping circuit 78 are fed to an AND gate 85, the output of which is differentiated by a differentiating circuit composed of a capacitor 86 and a resistor 87 and then is rectified by a diode 88 into pulses, as shown in FIG. 9, line (k). Moreover, the clock pulses (having the time duration of 0.65 milliseconds) of the FF 84 and the aforementioned clock 49 are fed to an AND gate 89, the output of which is further fed to a counter 90. This counter 90 is made operative to integrate the number of the clock pulses from the AND gate 89 at the pulse intervals corresponding to the input from the diode 88, i.e., the rotating speed of the engine 23, as seen from FIG. 9, line (l). As a result, the integrated value becomes the higher as the vehicular speed is the lower.

The second signal generator can receive its initial input from sources other than the engine itself, as will later be described. Any wheel of the vehicle, for example the front or back wheel of a bicycle has a peripheral velocity that is directly proportional to the vehicle's speed. Thus, the wheel itself can carry magnetic implants, or even provide spokes, which pass a pickup means mounted to the frame of the bicycle, and the resulting count can be used to generate a second signal, precisely as the count of spark plug sparks is used as already disclosed. The magnetic implants and the pickup thereby would form part of the second generator means.

The following description is directed to means for confirming the start of the engine 23 in accordance with the output of that counter. In accordance with the pulse timing determined by the output of the diode 88, the integrated value of the counter 90 is generated as binary signals, which are consecutively fed through a bus 92 to a memory 91 so that they may be stored therein. On the other hand, there are memorized such preset speed signals in comparing sections 93, 94 and 95 of the micom as correspond to preset vehicular rotating speeds $N_0$, $N_1$ and $N_2$ ($N_0 < N_1 < N_2$) so that the integrated value corresponding to the actual vehicular rotating speed N is compared with the rotating speeds $N_0$, $N_1$ and $N_2$ in the comparing sections 93, 94 and 95 each time it is generated. More specifically, with the output pulse intervals of the diode 88, the speeds $N_0$, $N_1$ and $N_2$ are compared with the integrated value of the counter 90. Moreover, the aforementioned preset rotating speed $N_2$ corresponds to the aforementioned stall rotating speed. Again it is emphasized that, while the use of micoms in whole or in part, is advantageous, they may be replaced in whole or in part by hard logical elements.

At the time when engine 23 is started to generate its pulses 67 such that its rotating speed N is higher than the preset value $N_0$, then the comparator 93 generates its output signals so that one second is measured by a timer 96, as shown in FIG. 9, line (h). The timer 96 generates the ON signals "1" for the aforementioned one second, as seen from FIG. 9, line (n), thereby to open an AND gate 97. If the rotating speed N of the engine 23 is higher than the preset speed $N_1$ for that one second, the comparator 94 generates the signals "1", as seen from FIG. 9, line (o). In other words, after confirming that the rotating speed N is abruptly increased from the value $N_0$ to the value $N_1$ for the one second, the AND gate 97 generates the signals "1". In response to the rise to the ON signals "1", an FF 98 is set. As shown in FIG. 9, line (p), the fact that the output of the FF 98 is at the "1" level implies that the engine 23 has already been started. In response to the engine starting signals of the FF 98, an AND gate 99 is opened. This AND gate 99 is supplied with the clock pulses having the time duration of 10 milliseconds from the aforementioned clock 50. The output of the AND gate 99 is fed to the aforementioned OR gate 54. Since the AND gate 99 is kept open, the pulses of the clock 50 are fed through the OR gate 54 to the adding and subtracting counter 55. If no input is fed to the subtraction command terminal 55a, the counter 55 accomplishes its addition to open the throttle valve 35 of the aforementioned carburetor 28. If, in this instance, the throttle valve 35 of the carburetor 28 has already been opened to its full stroke, it is maintained as it is.

The following description is concerned with stool control means for maintaining the rotating speed N of the engine 23 at the stool rotating speed $N_2$. Since the throttle valve 35 of the carburetor 28 is fully open when the engine 23 starts, the engine rotating speed has a tendency to rise abruptly. When the rotating speed N becomes higher than the speed $N_2$, the comparator 95 generates the ON signals, as seen from FIG. 9, line (r). The ON signals "1" of the comparator 95 are fed to the subtraction command terminal 55a of the adding and subtracting counter 55 through a priority circuit 100, which will be described hereinafter in more detail. As a result, the adding and subtracting counter 55 begins subtracting the clock pulses of the clock 50. In response to this subtraction, the aforementioned engine output power adjusting means 204 so turns the stepping motor 31 as to tend to close the throttle valve 35 of the carburetor 28. When the engine rotating speed N becomes lower than the speed $N_2$, the output of the comparator 95 is reduced to the "0" level so that the input of the subtraction command terminal 55a is also reduced to the same "0" level. As a result, the adding and subtracting counter 55 starts again its addition so that the throttle valve 35 of the carburetor 28 is reopened. The above operations are repeated so that the engine rotating speed N is held at the stall rotating speed $N_2$.

In the second signal generator means 201, as has been described above, the integrated value of the counter 90 corresponding to the vehicular speed is always stored in the storage 91 in accordance with the engine pulses 67.

Figure 10:
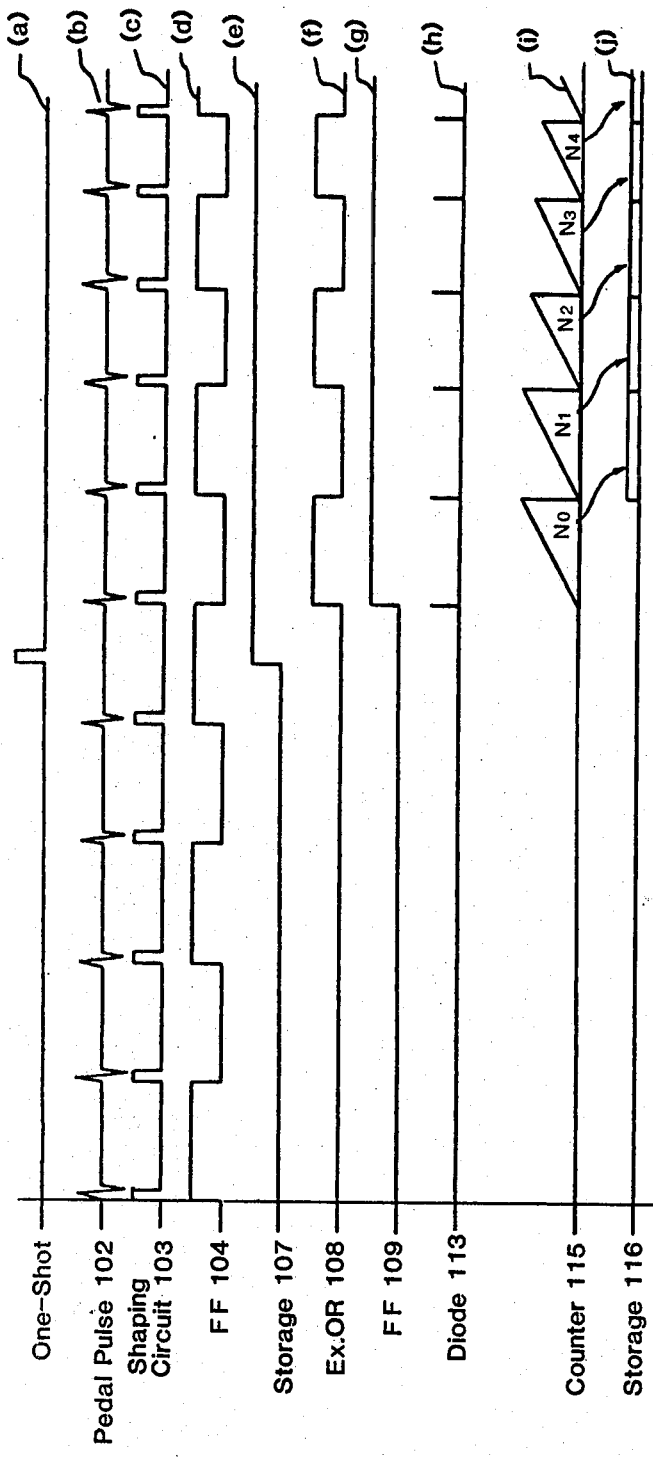

The first signal generator means 202 will now be described. The desired vehicular speed $V_d$ is most conveniently detected in terms of the rate of rotation of foot pedals 16, and the first description will describe such an embodiment. Other embodiments, such as sensing chain tension, will later be described. Turning now to FIG. 12, an electromagnetic type pickup 101 is arranged in the vicinity of the side of the teeth of chain sprocket 17 which is turned by the foot pedals. As a result, a voltage is induced in the pickup 101 each time a tooth of the chain sprocket 17 passes it. Thus, the pickup 101 and the chain sprocket 17 constitute together a generator of the first pulse. These first pulses (as shown in FIG. 10, line (b) have their waveforms shaped by a shaping circuit 103 (shown in FIG. 7) composed of a Schmidt circuit. (See FIG. 10, line (c)). The pedal pulses thus shaped are then subjected to frequency division by an FF 104 to have two half frequencies, as seen from FIG. 10, line (d).

On the other hand, the engine starting signals generated by the aforementioned FF 98 (as shown in FIG. 9, line (p)) are fed to a one-shot 105 so that the output shown in FIG. 10, line (a) is generated in response to the rise of those engine starting signals. The outputs of the one-shot 105 and the aforementioned FF 104 are then fed to an AND gate 106, the output of which in turn is stored in a storage 107. In other words, the memory 107 is stored with the output signals of the FF 104, as seen from FIG. 10, line (e), when the one-shot 105 generates its output. The outputs of the storage 107 and the FF 104 are fed to an EX OR 108, the output (as seen from FIG. 10 (f)) of which has its first rise retained in an FF 109, as shown in FIG. 10, line (g). In other words, the FF 109 continues generating the ON signals "1" after the polarity of the waveforms of the FF 104 is first changed subsequently to the generation of the signals by the one-shot 105. The outputs of the FF 109 and the shaping circuit 103 are fed to both an AND gate 110. The output of FF 109 is also fed to the aforementioned priority circuit 100. The output of the AND gate 110 is differentiated by a differentiating circuit composed of a capacitor 111 and a resistor 112 and then is rectified by a diode 113 into such pulses as shown in FIG. 10, line (h). Both the engine starting signals of the aforementioned FF 98 and the output of the clock 49 are fed to an AND gate 114, the output of which is further fed to a counter 115. This counter 115 integrates, as seen from FIG. 10 line (i), the clock pulses coming from the AND gate 114 at the pulse intervals corresponding to the input from the diode 113, i.e., the turning speed of the foot pedal 16. As a result, as the turning speed of the foot pedals is slowed, the integrated value of the counter 115 is reduced. The integrated value acts as a signal indicative of the vehicular speed desired by the driver.

The following description is directed to the second signal generator means 202 for commanding the desired vehicular speed in accordance with the output of the aforementioned counter 115. There is stored in a storage 116 the vehicular speed which is desired by the driver, as will be described hereinafter in more detail. This desired vehicular speed is changed in accordance with the various possible operations of the driver, e.g., (1) the continuous change or (2) abrupt stop of the foot pedals 16 or (3) the application of the brake. First, explanation will be made on the case where the brake is not applied. A braking operation detecting means is adapted to generate a brake signal of the level "1" with no application of the brake. The brake signal "1" is fed to a NOT input terminal of an AND gate 119. Therefore, the AND gate 119 is closed when the brake is not applied, so that the "1" output of the FF 98 fed to the other input terminal of the AND gate 119 cannot pass through this AND gate 119. Thus, the output of the AND gate 119 is an OFF signal, which is in turn fed to an input terminal of an AND gate 120 and also to the NOT input terminal of an AND gate 121, so that the AND gate 120 is closed and the AND gate 121 is opened. The turning conditions of the foot pedals 16 are changed smoothly and continuously, since the AND gate 121 is opened, the newly established desired vehicular speed is consecutively transferred from the counter 115 to the storage 116 through an AND gate 121 and an OR gate 123 so that it may be stored in the storage 116, as seen from FIG. 10 line (j). More specifically, the integrated value of the storage 116, which is at the zero speed level at an initial stage, is compared at a comparator 117 with the integrated value of the counter 115 so that the content of the counter 115 is automatically transferred through the AND gate 121 and the OR gate 123 to the storage 116 when it is lower than that of the storage 116 (accelerating condition). On the contrary, when the value of the counter 115 is higher than that of the storage 116 (decelerating condition), both of them are differentiated by a differentiator 118 so that the content of the storage 116 is consecutively changed in accordance with the integrated value of the counter 115 when the difference in between is lower than a preset level while assuming that the changes in the turning conditions of the foot pedals 16 are accomplished smoothly and continuously.

On the contrary, the difference at the differentiater 118 will be higher than the preset level, when the driver stops his turning operations of the foot pedals 16. There the content of the storage 116 is maintained as it is in accordance with the commands from differentiator 118 with the assumption that the running conditions at the speed at that particular time continue to be desired. Namely, the content of storage 116 is not updated by the content of counter 115.

When the brake is applied, on the other hand, the storage 116 is consecutively changed in response to the braking signals in accordance with the vehicular speed at that time, i.e., the content of the storage 91. Thus, the vehicular speed at the time when the brake is released is stored in the storage 116 so that the engine is controlled to keep the vehicular speed as it is at the moment the brake is released unless and until the foot pedals 16 are turned after the release of the brake. The process for transferring the vehicular speed of the storage 91 to the storage 116 in response to the brake application is as follows.

The braking operation detecting means is so made that the braking signals are at the "0" level when the brake is applied. Those braking signals are fed to the NOT input terminal of an AND gate 119, the other input terminal of which is supplied with the output of the aforementioned FF 98. As a result, upon application of the brake the AND gate generates its ON signals to open an AND gate 120 but to close the AND gate 121. Incidentally, this AND gate 121 is made to have its NOT input terminal supplied with the output of the AND gate 119. On the other hand, the AND gate 120 is supplied with the integrated binary value of the aforementioned storage 91 by way of a bus 122. Under the brake applied condition, the integrated value of the storage 91 is fed to the storage 116 through the AND gate 120 and the aforementioned OR gate 123.

If turning of the foot pedals 16 is stopped, and no brake is applied, it can be assumed without any difficulty that the desire of the driver is to continue the running operation at the speed at that particular time. In this case, the AND gate 121 is opened, whereas the content of the storage 116 is maintained as it is, as mentioned hereinbefore, so that the content of the counter 115 is not fed to the storage 116.

The desired vehicular speed thus stored in the storage 116 is compared at a comparator 124 with the vehicular speed which is stored in the storage 91. More specifically, if the desired vehicular speed is lower than the actual vehicular speed, then the comparator 124 generates its "1" signals, which are then fed to the subtraction command terminal 55a of the aforementioned adding and subtracting counter 55 by way of the priority circuit 100, which will be described hereinafter in more detail. As a result, the counter 55 starts its subtraction. Thus, the aforementioned output power controlling means 204 starts its operation directed to close the throttle valve 35 of the carburetor 28, i.e., to reduce the engine output power so that the running vehicular speed is accordingly lowered.

When the desired vehicular speed becomes higher than or equal to the actual running speed, the output of the comparator 124 is reduced to the "0" level so that the adding and subtracting counter 55 starts its addition to increase the engine output power. In those ways thus described, the actual vehicular speed is always controlled to approach its desired value.

Figure 13A:
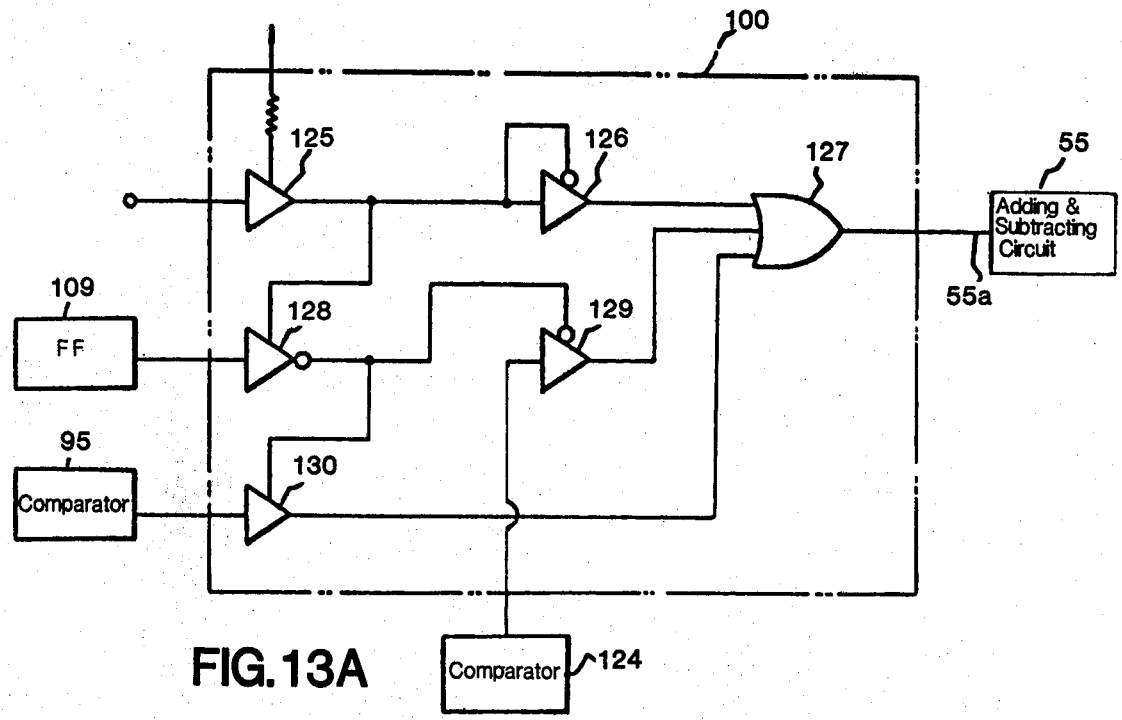
FIG. 13(A) is a block diagram showing the details of a priority circuit.

The priority circuit 100 is as follows. This circuit 100 is made operative to decide the priority among the braking signals and the outputs of the comparators 124 and 95 in the order recited so that the subtraction command may be fed to the subtraction counter 55. The specific construction of the priority circuit 100 is illustrated in FIG. 13(A).

Figure 13B:
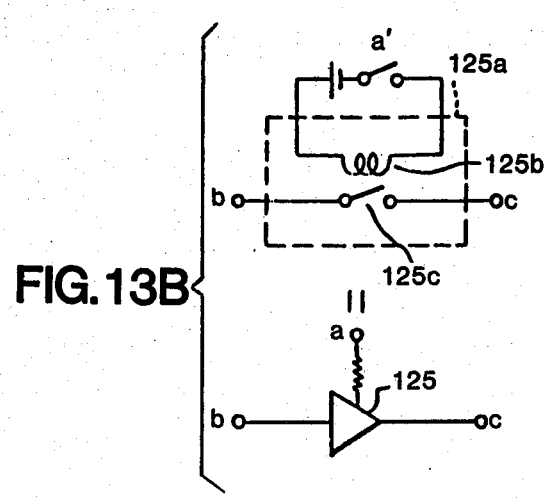
FIG. 13(B) is a connection diagram showing a gate to be used with the priority circuit of FIG. 13 (A)

Before entering into the description of the priority circuit 100, a gate 125 to be used therewith will now be described with reference to FIG. 13(B). As shown, the gate 125 is of three-valued type having three terminals a, b and c. More specifically, the gate 125 is opened only when the input terminal a is at the "1" level, which is fed as it is out of the output terminal c if the other input terminal b is at the "1" level. When the input terminal a is at the "0" level, there is no output from the output terminal c, either the input terminal b is "1" level or "0" level. In other words, the gate 125 is made equivalent to a relay 125a which is also shown in FIG. 13(B). That is to say, when a switch a' is turned on a relay coil 124b is excited to turn on a contact 124c between the input terminal b and the output terminal c. As a result, if the braking signals are fed to the priority circuit 100, they are allowed to take the most priority so that they are inverted by a gate 126, after having passed through the gate 125, until they are fed to an OR gate 127. Since, in this instance, the braking signals are at the "0" level when the brake is applied, the OR gate 127 is at the "1" level at the braking time thereby to feed the subtraction command to the adding and subtracting counter 55. On the other hand, the subtraction command from the comparator 124 is controlled by the FF 109. More specifically, the FF 109 is made operative, as has been described before, to generate the signals shown in FIG. 10 line (g) according to preset conditions during the time while the foot pedals 16 are turned. The signals thus generated open a gate 129 through a gate 128 so that the subtraction command of the comparator 124 is fed to the OR gate 127. On the other hand, the output of the comparator 95, which is made operative to generate its ON signals "1" when the engine 23 reaches a rotating speed higher than the stall value $N_2$, is fed to the OR gate 127 through a gate 130. When the brake is applied, the braking signals are reduced to the "0" level so that both the gates 128 and 130 are closed in response to the output of the gate 125. As a result, the braking signals can take the most priority. On the other hand, during the time while no brake is applied, the braking signals are at the "1" level, the output of the gate 125 is also at the "1" level so that the gate 128 is opened. Therefore, if the FF 109 is at the "1" level, the gate 130 is closed. As a result, only the subtraction command of the comparator 124 is allowed to enter the OR gate 127. On the other hand, if the braking signals are at the "1" level but the output signals of the FF 109 are at the "0" level, the OFF signals "0" of the FF 109 are inverted at the output terminal of the gate 128 so that the gate 130 is opened. As a result, only the subtraction command of the comparator 95 are fed to the OR gate 127.

Figure 14:
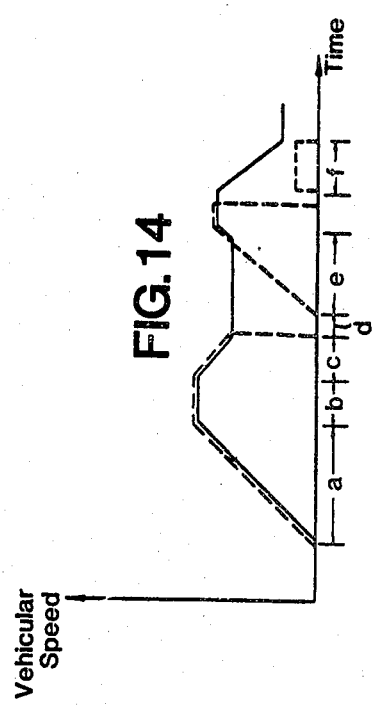
FIG. 14 is a graphical presentation showing the speed control characteristics of the speed control system of the present invention.

The speed control characteristics of the embodiment thus far described are illustrated in FIG. 14. During the acceleration period a, the desired vehicular speed can be established as shown by the broken line, by turning the foot pedals 16 so that the throttle valve 35 of the carburetor 28 of the engine 23 is accordingly opened in a gradual manner. If the rate of turning the foot pedals 16 is kept constant, the vehicle runs at a constant speed proportional to the rate at which the pedals are turned, as shown at FIG. 14(b). If, on the contrary, the pedals are turned more slowly, the throttle valve 35 of the carburetor 28 is gradually closed, as seen from FIG. 14(c) and the vehicle slows down. If, at this time, the pedals 16 are stopped, the turning speed of the pedals 16 at that moment is stored so that the vehicle will continue to run at the speed it had at that particular time, as seen from FIG. 14(d) and (e). If the pedals 16 are turned again until the desired vehicular speed of the driver given by the pedals 16 exceeds the actual running speed, the engine is controlled again to follow the desired value. Now, if the brake is applied, the decreasing running speed is consecutively stored during the braking period FIG. 14(f) so that the throttle valve 35 of the carburetor 28 is controlled to ensure the running operation at the speed at the particular time when the brake is released.

Although, in the embodiment thus far described, the desired vehicular speed is detected with the use of the chain sprocket 17 which is turned together with the foot pedals 16, the present invention should not be limited to such embodiment but can be extended to various modifications, in one of which the engine output power is controlled by calculating the necessary driving power from the tension being applied to chain 20. FIG. 14A shows such an embodiment.

In FIG. 14A, the same pedals, sprocket, and chain are shown. However, instead of being responsive to pulses directly indicative of the actual rate of turning of the sprocket 17, a spring-loaded chain tensioner 300 is provided, which includes a spring-loaded arm 301 carrying a roller 302 at its free end. Its base 303 is mounted to the vehicle frame. A variable resistance resistor (variable resistor 304 is set by the arm. When the operator desires to accelerate, the upper course 305 of the chain will become tighter, and arm 301 will be turned counter-clockwise. When he desires to slow down or coast, the chain will become looser in that course, and the spring-loading will move the tensioner arm clockwise. The resistance of the resistor will be increased in one situation, and decreased in the other, and the amount will be proportional to the tension in the chain. Thus, the resistor acts as a sensor to determine the desired speed.

Figure 15:
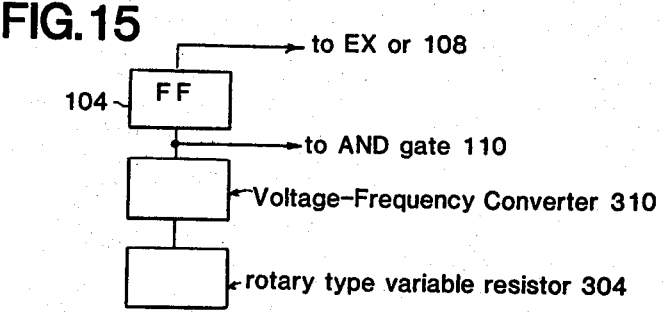
FIG. 15 is a fragmentary block diagram showing circuit logic for utilizing the device of FIG. 14.

FIG. 15 shows circuit logic to incorporate the embodiment of FIG. 14A into the system in place of the second signal generator means already described. For this a voltage is applied to the variable resistor (or potentiometer if preferred), and a voltage is produced by it which is proportional to the chain tension, and thereby the desired speed. This is, of course, a "first signal". This is applied to a conventional voltage to frequency converter 310 which produces a digital signal that is applied to flip-flop 104 and to AND gate 110. Thereafter the entire system functions as already described.

Figure 16:
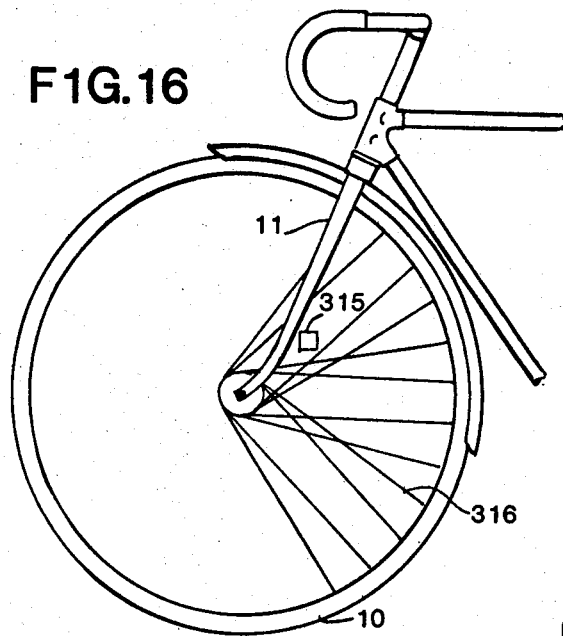
FIG. 16 is a fragmentary view of another embodiment of means for generating a second signal.

FIG. 16 shows the use of a wheel as the source of the second signal instead of the engine. In the illustration, the front wheel is used as a signal source. However, the rear wheel could be used instead. Thus, it makes no difference which wheel is used. The wheel is a direct measure of ground speed, while the engine is an indirect measure. Both techniques are quite suitable.

A sensor 315 is shown mounted to front fork 11 in adjacency to the spokes 316 of the wheel. The sensor is conveniently the same type as sensor 101, to produce a second signal at the passage of each spoke. This signal is, of course, proportional to vehicular speed.

Figure 17:
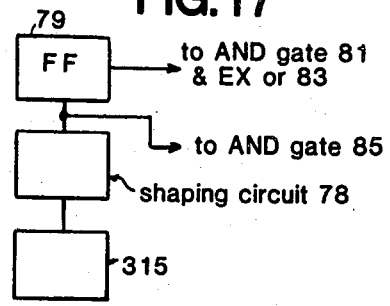
FIG. 17 is a fragmentary block diagram showing circuit logic for utilizing the device of FIG. 16.
Figure 14:
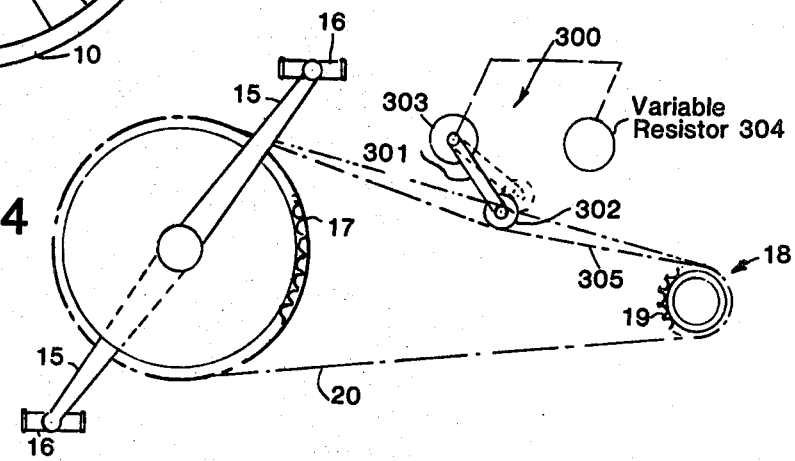

FIG. 17 shows how the second signal generated in FIG. 16 will be applied. The front wheel pulse is applied to shaping circuit 78, whose output is applied to flip-flop 79 and to AND gate 85. The flip-flop's output is applied to AND gate 81 and EX OR 83. The function is the same as already described.

Braking signals are conveniently generated as an off-on signal from a micro-switch (not shown) whose switch condition is controlled by a braking lever mounted to the steering handle. Thus, a voltage or current output, or absence of one, will determine whether the brake is applied or not, and this signal will be applied as already described.

As has been described hereinbefore, since the speed control system of the present invention is so constructed that the increase and/or decrease in the engine output power is electrically controlled in accordnace with the turning condition of the foot pedals, it will be appreciated as a feature of the present invention that the engine output power can be controlled merely with the use of the foot pedals and that the provision of an accelerator pedal or the like upon the handle is not required. This simplifies the operations while improving the drivability.

Moreover, in case the engine is used as an auxiliary driving power source so that the vehicular speed command signals according to the turning conditions of the foot pedals are operationally compared with the actual vehicular speed to control the engine output power in accordance with the operational result, it should also be appreciated that the force required to turn the foot pedals can be reduced without giving up the feeling of driving a bicycle.

The slowing of the vehicle when a lesser speed is desired can, of course, be caused by a brake. It can also be assisted by engine compression when the throttle is closed down. Any suitable motive power means can be used, but an internal combustion engine will ordinarily be preferred because of its fuel convenience and because of its assistance in decelerating and retarding the descent of a hill with a nearly closed throttle.

The term "comparator means" as used herein where the first and second signals are compared and worked upon is not to be limited to any specific type of circuit or device. The term is intended to connote a comparison device which senses any difference between the systems and acts to control an actuator.

Certain circuit components will be identified by their sources, as follows:

| | | |
|---|---|---|
| T.I. | SN7414 | Shaping Circuit (78,103) |
| T.I. | SN74121 | One-Shot multivibrator (80,105); timer (96) |
| T.I. | SN7400 | Clock Pulse Generator (49) |
| T.I. | SN7485 | Comparator (93,94,95,117,124); a part of Differentiator76 (118) |
| T.I. | SN74192 | Adding & Subtracting Counter (55); Clock (50); Timer (51); Counter (90,115) |
| R.C.A. | CD4076B | Storage (91,116) |
| T.I. | SN74278 | Priority Circuit (100) |
| T.I. | SN7472 | FF (79,52,84,98,104,109); Storage (82,107) |
| T.I. | SN7480 | A part of Differential (118) |
| Matsushita Electronics Corporation | MN1400 | Micro Computer |

"T.I." means Texas Instruments Incorporated, and the part is described by the number in its publication entitled "The TIL Data Book for Design Engineers, Second Edition".

"RCA" means RCA Corporation, and the part is described by its number in its publication entitled "RCA Integrated Circuits" copyright 1976.

"Matsushita Electronics Corporation" means the corporation of that name, and its Micro Computer MN 1400 is shown in its publication with that title. Its head office in the United States is at P.O. Box 1503 Secaucus, New Jersey 07094.

A battery 700 (FIG. 11) supplies energy to operate motor 31. It, or a similar battery, will be provided to supply the necessary electrical voltages and currents to operate the logic circuits, sensors and the like. The latter is not shown, because it wll be evident to all persons skilled in the art, where to place it.

The term "crank drive system" means a system which includes a crank that is couplable to a wheel to drive the wheel. It does not merely mean a direct joinder of crank and wheel, although it could, but includes transmission means for coupling them, such as the sprocket and chain assembly shown in the drawings.

It is evident that the speed control system is of general utility in vehicles, and is not dependent on the concurrent application of driving force to the vehicle itself by the operator. However, when the two features are combined, starting loads on the engine are importantly reduced, and the occupant continues to enjoy the feeling of actually riding and driving a bicycle or other vehicle, but with proportionalized force assistance, and with the capacity to continue at a steady speed under power with or without his physical assistance.

This invention is not to be limited by the embodiments shown in the drawings and described in the description, which are given by way of example and not of limitation, but only in accordance with the scope of the appended claims.

I claim:

1. A vehicle speed control for a wheeled vehicle of the type that has a brake, and drive means which includes a pedal-driven crank drive system including a crank which is drivingly couplable to a wheel of said vehicle, the rotational velocity of said crank when drivingly coupled to one of said wheels being directly proportional to the linear velocity of the vehicle, and which vehicle is propellable by power motive means, said motive means when driving said vehicle has a speed that is directly proportional to the vehicle speed, said power motive means including a power output control, said control being selectively adjustable to vary the power output of said power motive means, said vehicle speed control comprising:
   actuator means for adjusting said power output control;
   first signal generator means driven by said crank drive system for generating a first signal proportional to a desired vehicle speed;
   second signal generator means for generating a second signal proportional to the actual vehicle speed;
   comparator means for comparing said first and second signals and, as a consequence of an observed difference between them, causing said acutator means to adjust said power output control, whereby to adjust the power output of said power motive means to a level which tends to eliminate said difference in speeds and causes the vehicle to approach said desired vehicle speed;
   brake operation detecting means for generating a signal as a consequence of actuating said brake; and
   storage means in said comparator means for containing the actual linear velocity of the vehicle, said comparator means, upon the cessation of a first signal from said first signal generator means and in the absence of a signal from said brake operation detecting means, controlling said actuator to maintain said actual velocity at the value it had at the time when said first signal generator means ceased supplying said first signal.

2. A vehicle speed control according to claim 1 in which said crank drive system, and thereby the first signal generator means, are actuated by an occupant of said vehicle, by turning said crank at a rate of rotation proportional to said desired vehicle speed when said occupant desires to maintain continuous direct control over the linear velocity of the vehicle.

3. A vehicle speed control according to claim 2 in which said first signal generator is a rotary device.

4. A vehicle speed control according to claim 3 in which said first signal generator includes discontinuities which are sensed by a sensor to provide said first signal.

5. A vehicle speed control according to claim 4 in which said crank includes foot pedals.

6. A vehicle speed control according to claim 5 in which said discontinuities comprise teeth on a sprocket gear connected to said crank.

7. A vehicle speed control according to claim 1 in which said power motive means is an internal combustion engine having a carburetor and a throttle, said actuator means adjusting the setting of said throttle in order to vary the said power output.

8. A vehicle speed control according to claim 7 in which said actuator means comprises a bi-directional stepper motor.

9. A vehicle speed control according to claim 8 in which said throttle is a plunger type which is threadedly connected to said stepper motor, whereby to vary the cross-section of a portion of the induction passage to said engine.

10. A vehicle speed control according to claim 1 in which said second signal generator means comprises a sensor responsive to cycles of said power motive means.

11. A vehicle speed control according to claim 1 in which said second signal generator comprises a sensor responsive to ignition means in said power motive means.

12. Apparatus according to claim 1 in which said storage means comprises a memory which stores the most-recent value of said first signal, and continues to supply to said comparator means said most-recent value should said first signal generator cease providing a first signal, and no brake has been applied to the vehicle.

13. A vehicle speed control according to claim 12 in which said crank drive system, and thereby the first signal generator means, are actuated by an occupant of said vehicle, by turning said crank at a rate of rotation proportional to said desired vehicle speed when said occupant desires to maintain continuous direct control over the linear velocity of the vehicle.

14. A vehicle speed control according to claim 13 in which said first signal generator is a rotary device.

15. A vehicle speed control according to claim 14 in which said crank includes foot pedals.

16. A vehicle speed control according to claim 12 in which said power motive means is an internal combustion engine having a carburetor and a throttle, said actuator means adjusting the setting of said throttle in order to vary the said power output.

17. A vehicle speed control according to claim 16 in which said comparator means includes means for causing said actuator, after the release of an immediately previously-applied brake control, to maintain the actual speed of the vehicle at the velocity it had at the time the brake was released.

18. A vehicle speed control according to claim 17 in which said vehicle includes a centrifugal clutch and in which said comparator means includes means for maintaining the speed of said power motive means at or below a stall rotating speed while the vehicle is halted, pending the generation of a first signal representative of a power motive means speed greater than that of said stall rotating speed.

19. A vehicle speed control according to claim 1 in which said comparator means includes means for causing said actuator, after the release of an immediately previously-applied brake control, to maintain the linear velocity of the vehicle at the velocity it had at the time the brake was released.

20. A vehicle speed control according to claim 1 in which said comparator means includes means for causing said actuator to set the power output control to an engine starting condition at the time said power motive means is started.

21. A vehicle speed control according to claim 1 in which said vehicle includes a centrifugal clutch, and in which said comparator means includes means for maintaining the speed of said power motive means at or below a stall rotating speed while the vehicle is halted, pending the generation of a first signal representative of a power motive means speed greater than that of said stall rotating speed.

22. A vehicle speed control according to claim 1 in which said second signal generator means comprises a sensor responsive to revolution of a wheel of said vehicle.

23. A vehicle speed control according to claim 22 in which said sensor is responsive to magnetic means carried by said wheel.

24. A vehicle speed control according to claim 23 in which said magnetic means comprises spokes of said wheel.

25. A vehicle speed control according to claim 1 in which said crank drive system includes a drive chain, and in which said first signal generator includes a chain tension responsive element, whereby tension on the drive chain is sensed and used to determine the value of said first signal.

26. A method for controlling the speed of a wheeled vehicle that has a brake, and drive means which includes a pedal-driven crank drive system including a crank which is drivingly connectible to a wheel of said vehicle, the rotational velocity of said crank when drivingly coupled to one of said wheels being directly proportional to the linear velocity of the vehicle, and which vehicle is propellable by power motive means, which said power motive means has a speed that is directly proportional to the vehicle speed, said power motive means including a power output control, said control being adjustable selectively to vary the power output of said motive means and including actuator means for adjusting said power output control, first signal generator means driven by said crank drive system for generating a first signal proportional to a desired vehicle speed, second signal generator means for generating a second signal proportional to the actual vehicle speed, and comparator means for comparing said first and second signals, said comparator means including storage means for containing the actual linear velocity of said vehicle, and brake operation detecting means for generating a signal as a consequence of actuating said brake, said method comprising:
 (a) with said comparator means comparing said first and second signals to detect any difference between them;
 (b) actuating said actuator means to adjust said power output control to tend to eliminate said difference and cause said actual vehicle speed to approach said desired vehicle speed; and
 (c) upon cessation of a first linear signal from said first signal generator means and in the absence of a signal from said brake operation detecting means, controlling said actuator to maintain said actual velocity at the value it had at the time when said first signal generator means ceased supplying said first signal.

27. The method of claim 26 in which said first signal is generated by an occupant of the vehicle as the consequence of rotating said crank.

28. The method of claim 26 which further includes resetting the power output control to a starting condition prior to the starting of the motive means.

29. The method of claim 26 in which said method includes maintaining the power output at or below a stall rotating speed when the motive means is operating but the vehicle is not moving as the consequence of a first signal proportional to a speed less than said stall rotating speed.

30. In combination:
 a wheeled vehicle including a frame, a brake, and at least one wheel mounted to said frame and drive means including a pedal driven crank drive system including a crank which is drivingly couplable to a wheel of said vehicle, the rotational velocity of said crank when drivingly coupled to one of said wheels being directly proportional to the linear velocity of the vehicle, and which vehicle is propellable by power motive means,
 said motive means when driving said vehicle having a speed which is directly proportional to the vehicle speed, said power motive means including a power output control, said control being selectively adjustable to vary the power output of said power motive means, and a vehicle speed control said vehicle speed control comprising:

actuator means for adjusting said power output control, first signal generator means driven by said crank drive system for generating a first signal proportional to a desired vehicle speed, second signal generator means for generating a second signal proportional to the actual vehicle speed;

comparator means for comparing said first and second signals and, as a consequence of an observed difference between them, causing said actuator means to adjust said power output control, whereby to adjust the power output of said power motive means to a level which tends to eliminate said difference in speeds and causes the vehicle to approach said desired vehicle speed;

brake operation detecting means for generating a signal as a consequence of actuating said brake; and storage means in said comparator means for containing the actual linear velocity of the vehicle, said comparator means, upon the cessation of a first signal from said first signal generator means and in the absence of a signal from said brake operation detecting means, controlling said actuator to maintain said actual velocity at the value it had at the time when said first signal generator means ceased supplying said first signal.

31. A combination according to claim 30 in which said first signal generator is powered by an occupant of said vehicle, at a rate of movement proportional to said desired vehicle speed.

32. A combination according to claim 31 in which said first signal generator is a rotary device.

33. A combination according to claim 30 in which said crank drive system, and thereby the first signal generator means, are actuated by an occupant of said vehicle, by turning said crank at a rate of rotation proportional to said desired vehicle speed when said occupant desired to maintain continuous direct control over the linear velocity of the vehicle.

34. A combination according to claim 30 in which said second signal generator means is responsive to engine cycles.

35. A combination according to claim 30 in which said second signal generator means is responsive to revolution of said wheel.

36. A combination according to claim 30 in which said vehicle includes a drive chain, and in which said first signal generator includes a chain tension responsive element, whereby tension on the drive chain is sensed and used to determine the value of said first signal.

* * * * *